US007721842B2

(12) United States Patent
Forero

(10) Patent No.: US 7,721,842 B2
(45) Date of Patent: May 25, 2010

(54) ARTICULATED WORK VEHICLE STEERING SYSTEM WITH CONTROLLED STEERING CUSHIONING AND ASSOCIATED METHOD

(75) Inventor: Alvaro Jose Forero, Peosta, IA (US)

(73) Assignee: Deere & Company, Moline, IL (US)

( * ) Notice: Subject to any disclaimer, the term of this patent is extended or adjusted under 35 U.S.C. 154(b) by 413 days.

(21) Appl. No.: 11/514,467

(22) Filed: Sep. 1, 2006

(65) Prior Publication Data
US 2008/0053741 A1 Mar. 6, 2008

(51) Int. Cl.
*B62D 5/06* (2006.01)
(52) U.S. Cl. .................. 180/418; 180/419; 180/420; 180/421; 180/423
(58) Field of Classification Search .......... 180/418, 180/419, 420, 421, 423
See application file for complete search history.

(56) References Cited

U.S. PATENT DOCUMENTS

| 4,109,812 | A | 8/1978 | Adams et al. | |
|---|---|---|---|---|
| 5,537,818 | A | 7/1996 | Hosseini et al. | |
| H1846 | H | 4/2000 | Poorman | |
| 6,926,113 | B2* | 8/2005 | Hennemann et al. | 180/418 |
| 7,407,034 | B2* | 8/2008 | Vigholm | 180/422 |
| 7,624,836 | B2* | 12/2009 | Huang et al. | 180/423 |
| 2005/0087386 | A1* | 4/2005 | Hennemann et al. | 180/418 |
| 2005/0139412 | A1* | 6/2005 | Vigholm | 180/418 |
| 2008/0041655 | A1* | 2/2008 | Breiner et al. | 180/418 |
| 2008/0116000 | A1* | 5/2008 | Huang et al. | 180/418 |
| 2008/0210485 | A1* | 9/2008 | Vigholm et al. | 180/418 |

FOREIGN PATENT DOCUMENTS

CA 2440940 A1 3/2005

OTHER PUBLICATIONS

European Search Report dated Aug. 8, 2008, 4 pages.

* cited by examiner

*Primary Examiner*—Lesley Morris
*Assistant Examiner*—Marlon A Arce

(57) ABSTRACT

A steering system is provided for a work vehicle comprising articulated first and second vehicle sections. The steering system comprises a controller adapted to: determine from a speed-request signal if a requested steering speed requested for the first vehicle section relative to the second vehicle section about an articulation axis toward an end of an end region of a position range of the first vehicle section is at least a predetermined steering speed; determine from a position signal if the first vehicle section is positioned in the end region of the position range; and, if the requested steering speed is at least the predetermined steering speed and the first vehicle section is positioned in the end region, signal that an actual steering speed of the first vehicle section be lower than the requested steering speed. An associated method is disclosed.

16 Claims, 2 Drawing Sheets

ARTICULATED WORK VEHICLE STEERING SYSTEM WITH CONTROLLED STEERING CUSHIONING AND ASSOCIATED METHOD

FIELD OF THE DISCLOSURE

The present disclosure relates to steering systems of articulated work vehicles and associated methods.

BACKGROUND OF THE DISCLOSURE

Articulated work vehicles (e.g., wheel-mounted loaders) typically have first and second vehicle sections articulated to one another. Such work vehicles may be steered by movement of the first vehicle section relative to the second vehicle section in response to steering inputs from the vehicle operator.

SUMMARY OF THE DISCLOSURE

According to the present disclosure, there is provided a steering system for a work vehicle comprising articulated first and second vehicle sections. The steering system comprises a controller adapted to: determine from a speed-request signal if a requested steering speed requested for the first vehicle section relative to the second vehicle section about an articulation axis toward an end of an end region of a position range of the first vehicle section is at least a predetermined steering speed; and determine from a position signal if the first vehicle section is positioned in the end region of the position range. The controller is further adapted to signal that an actual steering speed of the first vehicle section be lower than the requested steering speed if the controller determines that the requested steering speed is at least the predetermined steering speed and the first vehicle section is positioned in the end region.

In this way, the steering system is able to "cushion" deceleration of steered movement of the first vehicle section about the articulation axis as the first vehicle section approaches an end of its position range. An abrupt stoppage of the first vehicle section relative to the second vehicle section is thereby avoided, which may be useful throughout the steering speed range of the first vehicle section, especially when the vehicle operator may be commanding a relatively high steering speed (e.g., maximum steering speed). Such a steering system may allow the elimination of mechanical stops from the work vehicle and promote reduction of stresses on the frame of the vehicle. It further may promote reduction of wear and tear on the vehicle and result in improved comfort for vehicle operators.

Exemplarily, the controller is an electronic controller receiving input signals from a steering input device and a position sensor. Manipulation of the steering input device causes generation of the speed-request signal inputted to the controller. The steering input device may be, for example, a steering wheel or a joystick. Joysticks are particularly prone to inducing the aforementioned abrupt stoppages at the ends of the position range of the first vehicle section. As such, the control routine of the controller would especially benefit from a steering system with a joystick. The position sensor is arranged for sensing the position of the first vehicle section relative to the second vehicle section and causing generation of the position signal inputted to the controller. It is, for example, an articulation angle sensor for sensing an articulation angle of the first vehicle section.

The exemplary controller outputs a control signal to a steering control valve to control operation of the steering control valve. The steering control valve controls hydraulic flow to a steering actuator in the form of, for example, first and second hydraulic steering cylinders extending between the first and second vehicle sections. If the controller determines that the requested steering speed is at least the predetermined steering speed and the first vehicle section is positioned in the end region, the controller sends the control signal to the steering control valve to cause the steering control valve to reduce hydraulic flow to the hydraulic steering cylinders so as to reduce the actual steering speed upon entry of the first vehicle section into either end region of the position range before the first vehicle section reaches a respective end of the position range. This effectively cushions stoppage of the first vehicle section as it approaches an end of its position range.

An associated method of operating a work vehicle comprising articulated first and second vehicle sections is disclosed. The method comprises: determining from a speed-request signal if a requested steering speed requested for the first vehicle section relative to the second vehicle section about an articulation axis toward an end of a position range of the first vehicle section is at least a predetermined steering speed, the position range comprising an end region extending from the end of the position range; determining from a position signal if the first vehicle section is positioned in the end region of the position range; and, if the requested steering speed is at least the predetermined steering speed and the first vehicle section is positioned in the end region, signaling that an actual steering speed of the first vehicle section be lower than the requested steering speed.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
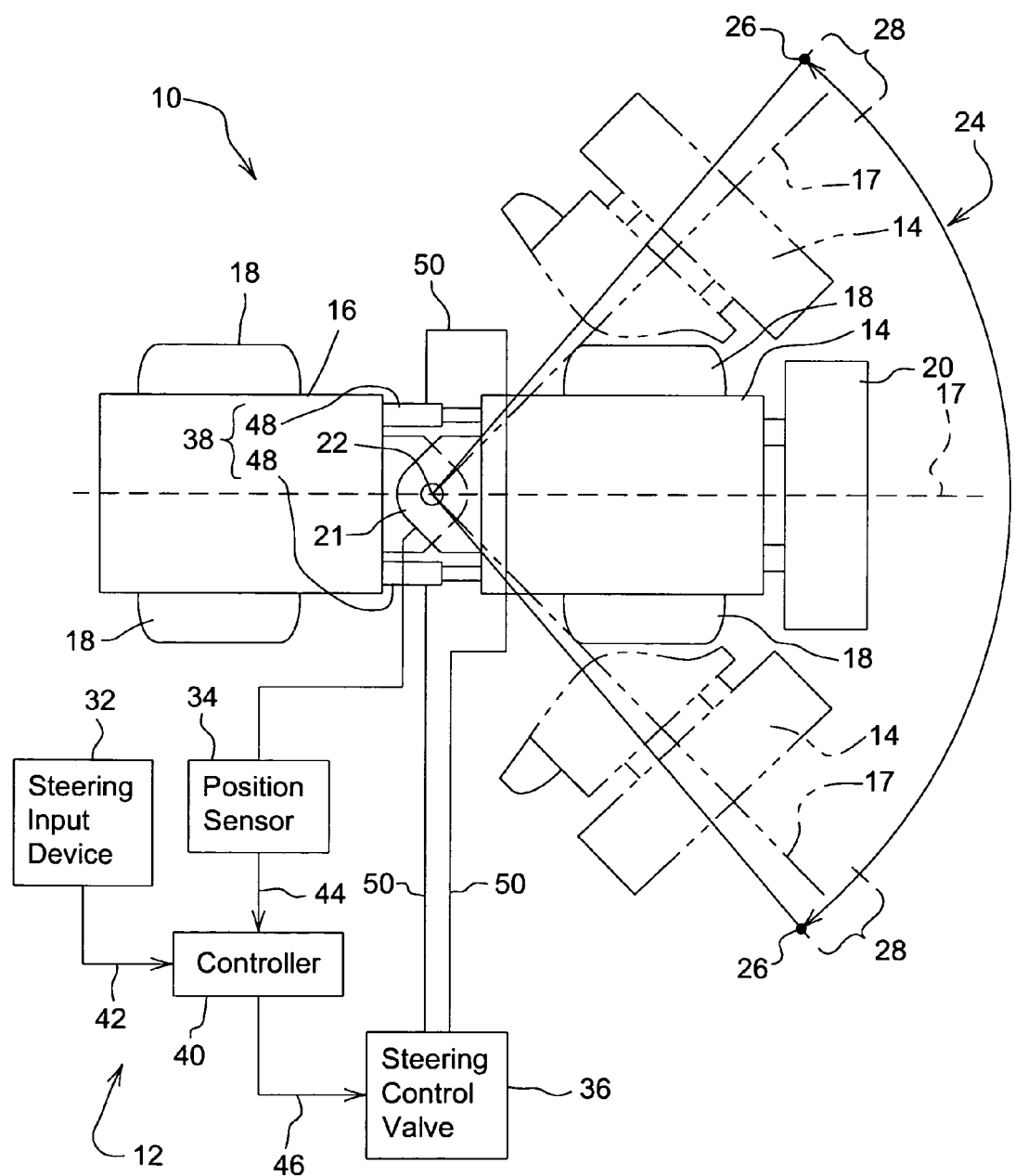
FIG. 1 is a diagrammatic view showing a steering system of an articulated work vehicle.

Referring to FIG. 1, there is shown in diagrammatic fashion an articulated work vehicle 10 with a steering system 12. Exemplarily, the work vehicle 10 is illustrated as a wheel-mounted loader having a first or front vehicle section 14 and a second or rear vehicle section 16 aligned along a longitudinal axis 17 of the vehicle 10. Wheels 18 supporting each of the first and second vehicle sections 14, 16 are used for propulsion of the vehicle 10. In this example, a work tool such as, for example, a bucket 20 is mounted to the first vehicle section 14 for manipulation thereby in a known manner.

The first vehicle section 14 is articulated to the second vehicle section 16 at an articulation joint 21. As such, the first vehicle section 14 is movable relative to the second vehicle section 16 about an articulation axis 22 at a variable steering speed within a position range 24, as indicated by the phantom images of section 14. The position range 24 comprises first and second ends 26 and first and second end regions 28 extending respectively therefrom toward an intermediate region 30 located between the end regions 28.

The steering system 12 exemplarily comprises a steering input device 32, a position sensor 34, a steering control valve 36, a steering actuator 38, and a controller 40. The steering input device 32 (e.g., steering wheel or joystick) is configured for generating a speed-request signal 42 representative of a requested steering speed requested for the first vehicle section 14 relative to the second vehicle section 16 about the articulation axis 22 toward an end 26 of the position range 24 upon manipulation of the steering input device 32 by the vehicle operator.

The position sensor 34 is configured for sensing a position of the first vehicle section 14 relative to the second vehicle section 16 and generating a position signal 44 representative of that position in response thereto. The position sensor 34 is, for example, an articulation angle sensor for sensing an articulation angle of the first vehicle section 14 relative to the second vehicle section 16.

The steering control valve 36 is configured for controlling hydraulic flow to the steering actuator 38. A pump or other source of pressurized fluid onboard the vehicle 10 supplies flow of hydraulic fluid (i.e., hydraulic flow) from a reservoir to the valve 36. The valve 36 is under the control of the controller 40 so as to be responsive to a control signal 46 therefrom. Exemplarily, the steering control valve 36 is an electro-hydraulic valve.

The steering actuator 38 receives hydraulic flow from the valve 36 to steer the first vehicle section 14 relative to the second vehicle section 16 about the articulation axis 22. Exemplarily, the steering actuator 38 includes first and second hydraulic steering cylinders 48 extending between the first and second vehicle sections 14, 16. The cylinders 48 receive hydraulic flow from the steering control valve 36 via hydraulic lines 50 to pivot the first vehicle section 14 relative to the second vehicle section 16 about the articulation axis 22 in left and right directions.

The controller 14 controls operation of the steering control valve 36 in response to operation of the steering input device 32 and the position sensor 34. Exemplarily, the controller 14 is an electronic controller having a processor and a memory. The memory has stored therein instructions which, when executed by the processor, cause the processor to perform the various functions of the controller 14.

Figure 2:
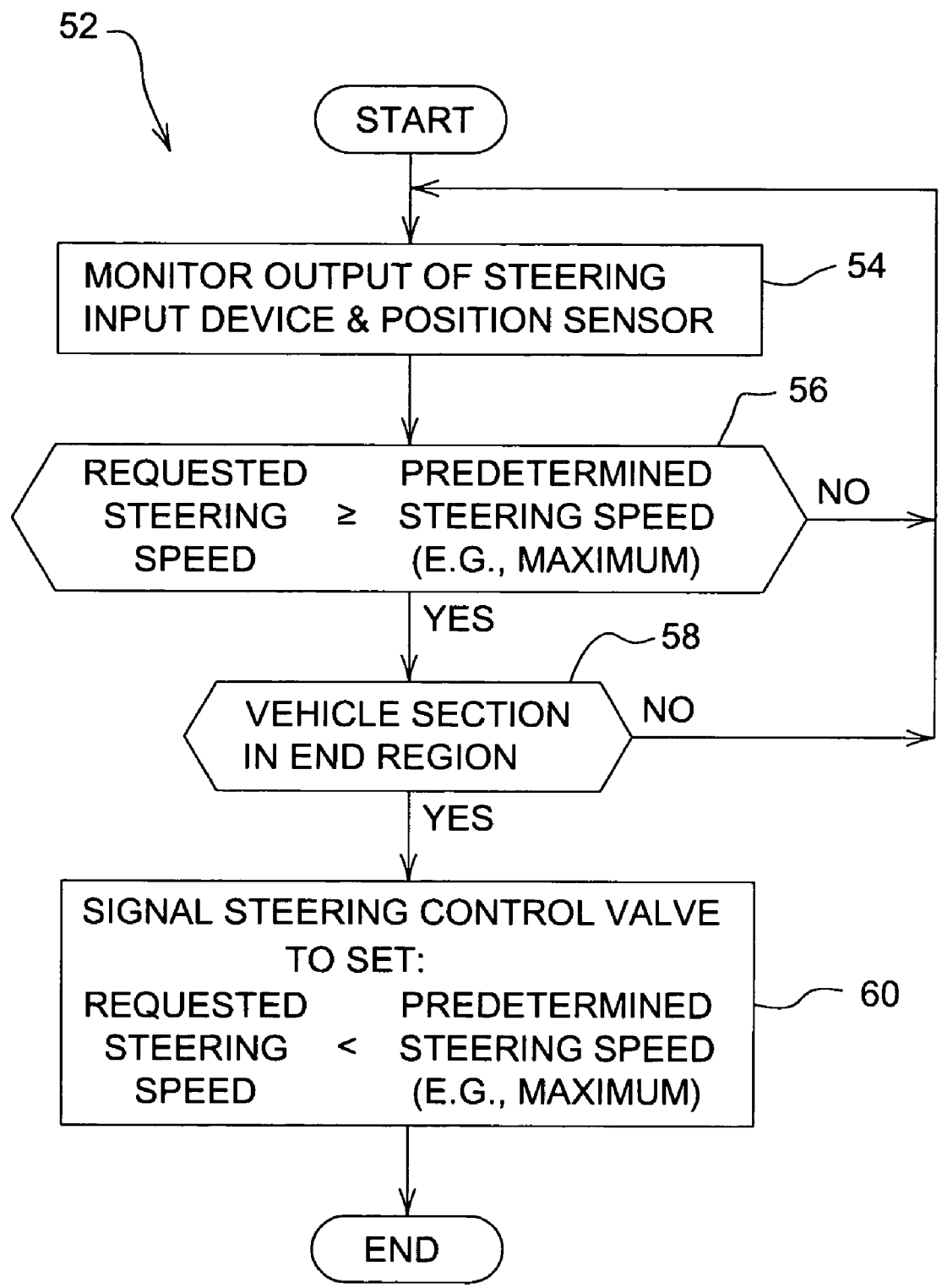
FIG. 2 is a diagrammatic view of a control routine of the steering system.

Referring to FIG. 2, there is shown a control routine 52 of the controller 14. In act 54, the controller 14 monitors output of the steering input device 32 (e.g., steering wheel or joystick) for the speed-request signal 42 and output of the position sensor 34 (e.g., articulation angle sensor) for the position signal 44. The control routine 52 then advances to act 56.

In act 56, the controller determines from the speed-request signal 42 if a requested steering speed requested for the first vehicle section 14 relative to the second vehicle section 16 about the articulation axis 22 toward an end 26 of either end region 28 of the position range 24 of the first vehicle section 14 is at least a predetermined steering speed (e.g., a maximum steering speed of the first vehicle section 14). If the requested steering speed is less than the predetermined steering speed, the control routine 52 returns to act 54. If the requested steering speed is at least the predetermined steering speed, the control routine 52 advances to act 58.

In act 58, the controller 40 determines from the position signal 44 if the first vehicle section 14 is positioned in the end region 28 containing the end 26 toward which the requested steering speed is directed. If the first vehicle section 14 is not positioned in that end region 28, the control routine 52 returns to act 54. If the first vehicle section 14 is positioned in that end region 28, the control routine 52 advances to act 60.

It is to be understood that, although the control routine 52 is illustrated as having act 56 occur before act 58, the controller 40 may alternatively be programmed such that act 58 occurs before act 56.

In act 60, if the requested steering speed is at least the predetermined steering speed and the first vehicle section 14 is positioned in the end region 28 containing the end 26 toward which the requested steering speed is directed, the controller 40 signals that an actual steering speed of the first vehicle section 14 be lower than the requested steering speed. Exemplarily, the controller 40 signals the steering control valve 36 to control hydraulic flow to the steering actuator 38 so as to set the actual steering speed of the first vehicle section 14 at a level lower than the requested steering speed.

Take, for example, a situation where an operator is manipulating the steering input device 32 in a manner requesting that the first vehicle section 14 move relative to the second vehicle section 16 about the articulation axis 22 toward one of the ends 26. When the first vehicle section 14 is in the intermediate region 30, the controller 40 signals the steering control valve 36 to control hydraulic flow to the steering actuator 38 in a manner so as to set the actual steering speed at the requested steering speed, regardless whether the actual steering speed will be equal to or greater than the predetermined steering speed, such as the maximum steering speed of the section 14. However, upon entry of the section 14 into the end region 28 containing the end 26 toward which the section 14 is moving, the position sensor 34 will sense that the section 14 has entered the end region 28 and provide a position signal 44 representative of this new end region position. Further, if the requested steering speed is at least the predetermined steering speed (e.g., maximum steering speed) according to the speed-request signal generated in response to manipulation of the steering input device 32, the controller 40 signals the control valve 36 to reduce hydraulic flow to the first and second hydraulic cylinders 48, thereby reducing the actual steering speed from the requested steering speed to a lower speed.

In this way, the steering system 12 is able to "cushion" deceleration of steered movement of the first vehicle section 14 about the articulation axis 22 as the first vehicle section 14 approaches either end 26 of its position range 24. An abrupt stoppage of the first vehicle section 14 relative to the second vehicle section 16 is thereby avoided, which may be useful throughout the steering speed range of the first vehicle section 14, especially when the vehicle operator may be commanding a relatively high steering speed (e.g., maximum steering speed). Such a steering system 12 may allow the elimination of mechanical stops from the work vehicle and promote reduction of stresses on the frame of the vehicle. It further may promote reduction of wear and tear on the vehicle and result in improved comfort for vehicle operators.

According to a specific embodiment of the steering system 12, the steering input device 32 is a joystick and the position sensor 34 is an articulation angle sensor mounted to the articulated joint between the vehicle sections 14, 16 to sense the articulation angle of the first vehicle section 14. The control routine 52 of the controller 40 may be especially useful with a joystick since joysticks in general are particularly prone to inducing the aforementioned abrupt stoppages at the ends 26 of the position range 24. Further, in this embodiment, the predetermined steering speed is the maximum steering speed of the section 14, requestable by maximum displacement of the joystick by the operator. As such, the controller 40 will determine from the speed-request signal if a request has been made for movement of the first vehicle section 14 relative to the second vehicle section 16 about the articulation axis 22 toward an end 26 of the position range 24 at a requested steering speed equal to the maximum steering speed. If such a request has been made and the controller 40 determines from the position signal 44 that the section 14 is positioned in the respective end region 28, the controller 40 signals and thus commands the steering control valve 36 to operate the steering actuator 38 so as to set the actual steering speed at a level lower than the requested maximum steering speed while the section 14 travels in the end region 28 toward the respective end 26, thereby electronically cushioning stoppage of the first vehicle section 14.

While the disclosure has been illustrated and described in detail in the drawings and foregoing description, such an illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A steering system for use with a work vehicle comprising articulated first and second vehicle sections, the first vehicle section being movable relative to the second vehicle section about an articulation axis at a variable steering speed within a position range comprising an end and an end region extending from the end of the position range, the steering system comprising a controller adapted to:
   determine from a speed-request signal if a requested steering speed requested for the first vehicle section relative to the second vehicle section about the articulation axis toward the end of the position range is at least a predetermined steering speed;
   determine from a position signal if the first vehicle section is positioned in the end region of the position range and moving toward the end of the position range; and
   if the requested steering speed is at least the predetermined steering speed and the first vehicle section is positioned in the end region and moving toward the end of the position range, signal that an actual steering speed of the first vehicle section be lower than the requested steering speed.

2. The steering system of claim 1, further comprising a joystick, wherein the controller is adapted to monitor output of the joystick for the speed-request signal.

3. The steering system of claim 1, further comprising a position sensor for sensing a position of the first vehicle section relative to the second vehicle section, and the controller is adapted to monitor output of the position sensor for the position signal.

4. The steering system of claim 1, further comprising a joystick and an articulation angle sensor for sensing an articulation angle of the first vehicle section, and the controller is adapted to monitor output of the joystick for the speed-request signal and output of the articulation angle sensor for the position signal.

5. The steering system of claim 1, further comprising a steering actuator and a steering control valve, and the controller is adapted to signal the steering control valve to control hydraulic flow to the steering actuator so as to set an actual steering speed of the first vehicle section at a level lower than the requested steering speed if the requested steering speed is at least the predetermined steering speed and the first vehicle section is positioned in the end region.

6. A method of operating a work vehicle comprising articulated first and second vehicle sections, the method comprising:
   determining from a speed-request signal if a requested steering speed requested for the first vehicle section relative to the second vehicle section about an articulation axis toward an end of a position range of the first vehicle section is at least a predetermined steering speed, the position range comprising an end region extending from the end of the position range;
   determining from a position signal if the first vehicle section is positioned in the end region of the position range and moving toward the end of the position range; and
   if the requested steering speed is at least the predetermined steering speed and the first vehicle section is positioned in the end region and moving toward the end region, signaling that an actual steering speed of the first vehicle section be lower than the requested steering speed.

7. The method of claim 6, comprising monitoring output of a joystick for the speed-request signal.

8. The method of claim 6, comprising monitoring output of a position sensor for the position signal.

9. The method of claim 6, comprising monitoring output of an articulation angle sensor for the position signal.

10. The method of claim 6, wherein determining if the requested steering speed is at least the predetermined steering speed comprises determining from the speed-request signal if the requested steering speed is a maximum steering speed of the first vehicle section.

11. The method of claim 6, wherein the signaling comprises reducing the actual steering speed of the first vehicle section from the requested steering speed to a lower speed upon entry of the first vehicle section into the end region.

12. The method of claim 6, wherein the signaling comprises signaling a steering control valve to reduce hydraulic flow to first and second hydraulic steering cylinders extending between the first and second vehicle sections.

13. A steering system for use with a work vehicle comprising articulated first and second vehicle sections, the first vehicle section being movable relative to the second vehicle section about an articulation axis at a variable steering speed within a position range comprising an end and an end region extending from the end of the position range, the steering system comprising a controller adapted to:
   determine from a speed-request signal if a requested steering speed requested for the first vehicle section relative to the second vehicle section about the articulation axis toward the end of the position range is at least a predetermined steering speed,
   determine from a position signal if the first vehicle section is positioned in the end region of the position range, and
   if the requested steering speed is at least the predetermined steering speed and the first vehicle section is positioned in the end region, signal that an actual steering speed of the first vehicle section be lower than the requested steering speed; and
   a position sensor for sensing a position of the first vehicle section relative to the second vehicle section, the controller adapted to monitor output of the position sensor for the position signal.

14. The steering system of claim 13, further comprising a joystick and an articulation angle sensor for sensing an articulation angle of the first vehicle section, and the controller is adapted to monitor output of the joystick for the speed-request signal and output of the articulation angle sensor for the position signal.

15. A method of operating a work vehicle comprising articulated first and second vehicle sections, the method comprising:
   determining from a speed-request signal if a requested steering speed requested for the first vehicle section relative to the second vehicle section about an articulation axis toward an end of a position range of the first vehicle section is at least a predetermined steering speed, the position range comprising an end region extending from the end of the position range;

monitoring output of a position sensor for a position signal;

determining from the position signal if the first vehicle section is positioned in the end region of the position range; and if the requested steering speed is at least the predetermined steering speed and the first vehicle section is positioned in the end region, signaling that an actual steering speed of the first vehicle section be lower than the requested steering speed.

16. The method of claim 15, wherein determining if the requested steering speed is at least the predetermined steering speed comprises determining from the speed-request signal if the requested steering speed is a maximum steering speed of the first vehicle section.

* * * * *